UNITED STATES PATENT OFFICE.

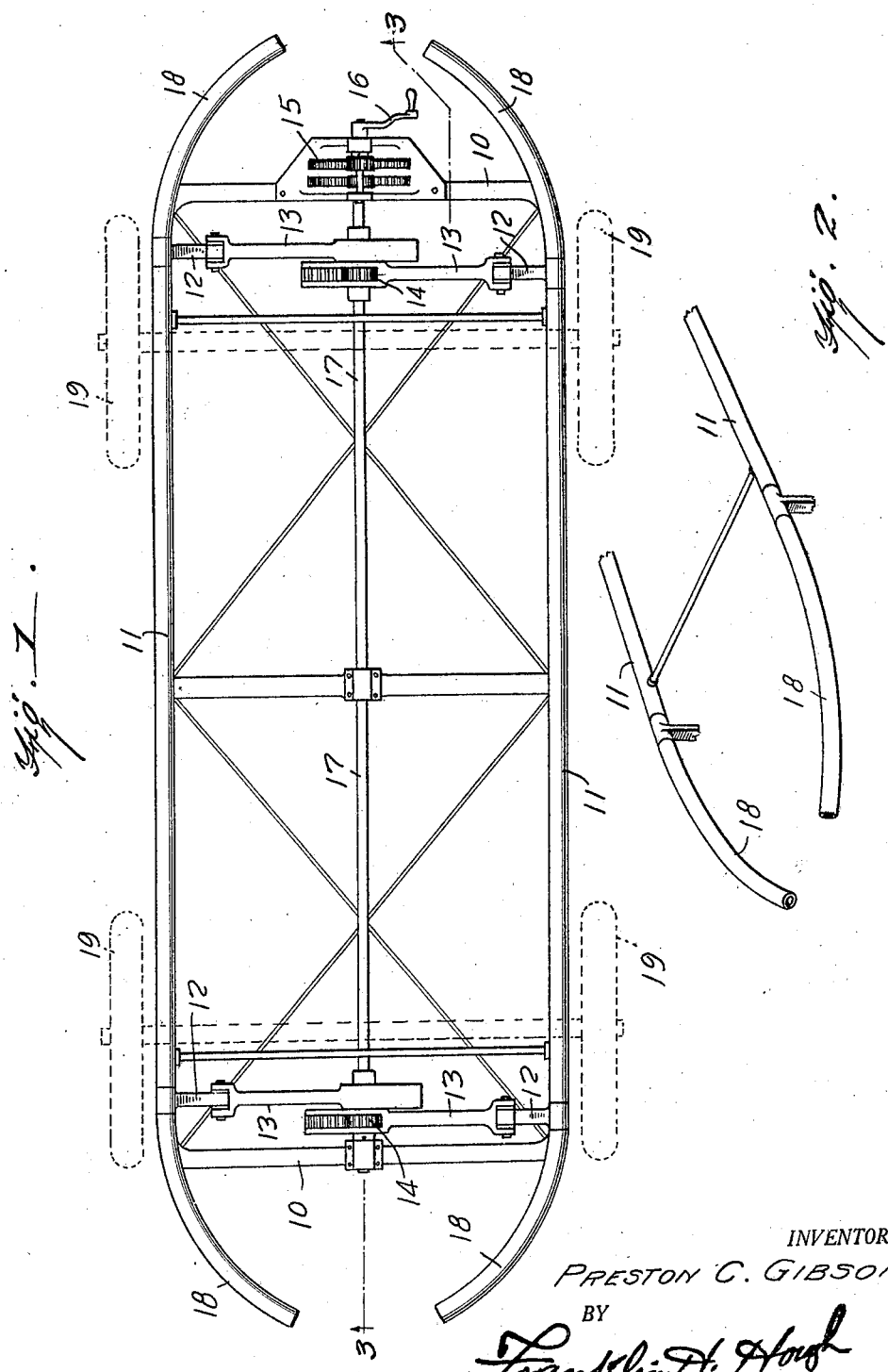

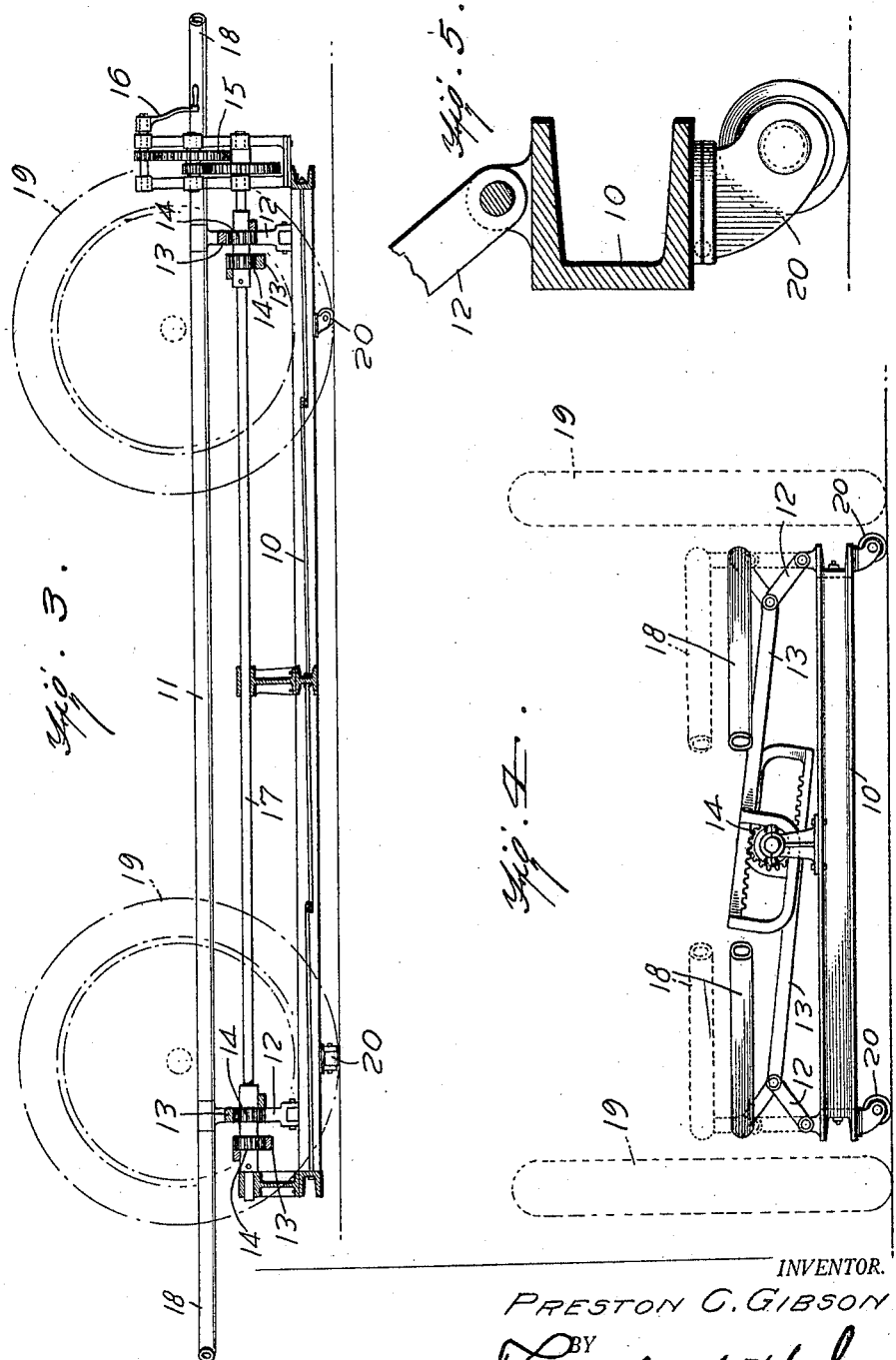

PRESTON C. GIBSON, OF GIRARD, ILLINOIS.

AUTOMOBILE-LIFTING DEVICE.

1,398,186.  Specification of Letters Patent.  Patented Nov. 22, 1921.

Application filed February 2, 1921. Serial No. 441,822.

*To all whom it may concern:*

Be it known that I, PRESTON C. GIBSON, a citizen of the United States, residing at Girard, in the county of Macoupin and State of Illinois, have invented certain new and useful Improvements in Automobile-Lifting Devices, of which the following is a specification, reference being had therein to the accompanying drawings.

This invention relates to automobile lifting devices and has for an object to provide a device especially intended as an improvement over my Patent #1,201,718, issued October 17, 1916, and embodying new and improved features of convenience and reliability.

A further object of the invention is to provide an automobile lifting device which will set normally on the floor of a garage or other housing, and movable when engaged by an automobile being driven over the same to prevent damage to the device and to the automobile.

A further object of the invention is to provide a frame with lifting means, the extremities of said frame being curved to form guides for the wheels of the vehicle passing over the same to prevent damage to either, and with means for permitting the adjustment of the lifting device automatically when engaged by the vehicle.

With these and other objects in view, the device comprises certain novel elements, units, parts, combinations, arrangements and functions as will be hereinafter more fully described and claimed.

In the drawings:

Figure 1 is a top plan view of the lifting device;

Fig. 2 is a fragmentary perspective view of one end of the frame showing the curved extremities;

Fig. 3 is a longitudinal sectional view of the device, taken on line 3—3 of Fig. 1;

Fig. 4 is a view of the device in end elevation showing in contracted position in full lines and lifted position in dotted lines, and Fig. 5 is a fragmentary detail view of one of the extremities and attaching means.

Like characters of reference indicate corresponding parts throughout the several views.

Like the device disclosed in said Patent #1,201,718, the present device comprises a base 10, preferably constructed of commercial iron, as for instance channel iron, as shown more clearly at Figs. 3 and 5, although it is to be understood that the particular type of commercial metal is unimportant.

Also like the disclosure in said patent, a frame 11 is mounted upon the base 10 with means for raising and lowering said frame. The same means to raise and lower the frame is here employed, consisting of toggle joints 12 having rack bars 13 connected therewith with pinions 14 engaging the racks and actuating the toggles. For the purpose of actuating the pinions 14 gearing 15 is provided with any means for applying power thereto, as the crank 16. From an examination especially of Fig. 4 it will be obvious that when the pinions 14 are rotated on the shaft 17 driven from the crank 16 gear 15 will move the racks 13 in either direction as circumstances may require to raise or lower the frame 11. In so far as thus described, the device is substantially similar to the disclosure of said patent. From use it is found, however, that the side bars formed parallel throughout the device and as an entirety substantially stationary, accidents occur by reason of careless or accidental engagement between the vehicle and the side bars. For this reason the side bars are formed with curved extremities 18 which are engaged by the wheels indicated in dotted lines at 19 in Fig. 1 as they pass over the structure, which for utility is located beneath the device. Casters 20 are also attached beneath the base 10 to permit the entire organization to be moved by such engagement of the wheels 19 with the curved portions 18 of the side frame, so that when such device is so engaged the movement will adjust the lifting device as an entirety to the position of the vehicle disposed thereabove. Also the casters are found desirable to permit the movement of the supported vehicle upon the supporting structure when it has been lifted by the manual actuation of the lifting device, as before described. The use of the casters for this last-mentioned purpose is, however, the primary use, which is to permit the adjustment of the device to the position of the vehicle.

What I claim to be new is:

1. An automobile lifting device comprising a caster-supported frame, a lifting frame disposed above the first-mentioned frame provided with an upper surface adapted to seat the axles of an automobile at divers positions thereon, and provided at its opposite ends with duplicate inturned curved extremities, and means to lift the lifting frame relative to the first-mentioned frame.

2. A lifting jack for automobiles comprising a pair of spaced apart supports having substantially a horizontal plane surface, adapted to seat the axles of an automobile at any position on said surface, and curved toward each other at both ends; a carriage for the supports provided with casters, and means for lifting the supports relative to the carriage.

3. In a lifting device for automobiles, the combination of a carriage comprising a rectangular frame of channel iron, an elliptical frame of tubing carried above the rectangular frame and adapted to seat the axles of an automobile upon its upper surface and extending at its ends beyond the rectangular frame and at its sides to the full width of the rectangular frame, means interconnecting the two frames to provide a relatively vertical movement between them, and casters carried by the rectangular frame.

In testimony whereof I hereunto affix my signature in presence of two witnesses.

PRESTON C. GIBSON.

Witnesses:
E. A. GIBSON,
J. T. GARST.